(12) United States Patent
Jiang et al.

(10) Patent No.: US 12,250,075 B2
(45) Date of Patent: Mar. 11, 2025

(54) SYSTEM AND METHOD FOR TRANSMISSION REPETITION MODE INDICATORS

(71) Applicant: ZTE CORPORATION, Guangdong (CN)

(72) Inventors: Chuangxin Jiang, Shenzhen (CN); Zhaohua Lu, Shenzhen (CN); Guozeng Zheng, Shenzhen (CN); Shujuan Zhang, Shenzhen (CN); Huahua Xiao, Shenzhen (CN); Hao Wu, Shenzhen (CN); Bo Gao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 366 days.

(21) Appl. No.: 17/737,758

(22) Filed: May 5, 2022

(65) Prior Publication Data

US 2022/0385401 A1  Dec. 1, 2022

Related U.S. Application Data

(63) Continuation of application No. PCT/CN2019/116233, filed on Nov. 7, 2019.

(51) Int. Cl.
H04L 1/08 (2006.01)
H04W 16/28 (2009.01)
(Continued)

(52) U.S. Cl.
CPC .............. *H04L 1/08* (2013.01); *H04W 16/28* (2013.01); *H04W 72/046* (2013.01); *H04W 72/23* (2023.01)

(58) Field of Classification Search
CPC ....... H04L 1/08; H04L 1/1854; H04L 1/1896; H04L 1/0026; H04L 1/1812;
(Continued)

(56) References Cited

U.S. PATENT DOCUMENTS

2018/0234997 A1  8/2018  Hosseini et al.
2019/0104514 A1* 4/2019  Chendamarai Kannan ................. H04L 1/00
(Continued)

FOREIGN PATENT DOCUMENTS

CN  108513724 A  9/2018
CN  109588059 A  4/2019
(Continued)

OTHER PUBLICATIONS

First Chinese Office Action on CN Appl No. 2022115810612, dated Jun. 7, 2023 (10 pages including English translation).
(Continued)

Primary Examiner — Jianye Wu
(74) Attorney, Agent, or Firm — Foley & Lardner LLP

(57) ABSTRACT

In one embodiment, a method performed by a wireless communication node includes configuring, by a wireless communication node, a transmission repetition mode and at least one resource for an uplink channel transmission of a wireless communication device, the transmission repetition mode indicating at least one of: a number of times of the uplink channel transmission to be performed, one or more multiplexing modes of the number of times of the uplink channel transmission to be performed, and one or more time locations of the number of times of the uplink channel transmission to be performed. The method includes transmitting, by the wireless communication node, the transmission repetition mode to the wireless communication device.

20 Claims, 11 Drawing Sheets

(51) Int. Cl.
*H04W 72/044* (2023.01)
*H04W 72/23* (2023.01)

(58) Field of Classification Search
CPC .. H04L 5/0053; H04W 16/28; H04W 72/046; H04W 72/23; H04B 7/0617
See application file for complete search history.

(56) References Cited

U.S. PATENT DOCUMENTS

2019/0305830 A1* 10/2019 Zhou ............... H04B 7/0697
2019/0319823 A1* 10/2019 Akkarakaran ........ H04W 76/27

FOREIGN PATENT DOCUMENTS

| CN | 109891790 A | 6/2019 |
| EP | 3 439 218 A1 | 2/2019 |
| WO | WO-2018/059306 A1 | 4/2018 |
| WO | WO-2018/128376 A1 | 7/2018 |
| WO | WO-2019/047152 A1 | 3/2019 |

OTHER PUBLICATIONS

Second Chinese Office Action on CN Appln. No. 2022115810612, dated Aug. 16, 2023 (14 pages, including English translation).
Extended European Search Report on EP Appln. No. 19951844.0, dated Apr. 5, 2023 (8 pages).
Huawei et al. "Enhancements on Multi-TRP/panel transmission" 3GPP TSG RAN WGI #97, RI-1906029 May 17, 2019(May 17, 2019), Reno, USA (17 pages).
International Search Report and Written Opinion for PCT Appl. No. PCT/CN2019/116233 mailed Aug. 5, 2020 (9 pages).
OPPO "Enhancements on multi-TRP and multi-panel transmission" 3GPP TSG RAN WGI Mee ting #98bis, RI-1910116 Oct. 20, 2019(Oct. 20, 2019), Chongqing, China (13 pages).

* cited by examiner

| 3 bits | 1st Transmission mode | 2nd Transmission mode | 3rd Transmission mode | 4th Transmission mode | 5th Transmission mode | 6th Transmission mode | 7th Transmission mode | 8th Transmission mode |
|---|---|---|---|---|---|---|---|---|
| '000' | | | | | | | | |
| '001' | | | | | | | | |
| '010' | | | | | | | | |
| '011' | | | | | | | | |
| '100' | | | | | | | | |
| '101' | | | | | | | | |
| '110' | | | | | | | | |
| '111' | | | | | | | | |

Figure 3

| 2 bits | 1st Time offset set | 2nd Time offset set | 3rd Time offset set | 4th Time offset set |
|---|---|---|---|---|
| '00' | | | | |
| '01' | | | | |
| '10' | | | | |
| '11' | | | | |

Figure 4

| 5 bits  | 1st PUCCH transmission mode | 2nd PUCCH transmission mode | ... | 32nd PUCCH transmission mode |
|---------|-----------------------------|-----------------------------|-----|------------------------------|
| '00000' | '00001' | ... | '11111' | |

Figure 6

SYSTEM AND METHOD FOR TRANSMISSION REPETITION MODE INDICATORS

CROSS-REFERENCE TO RELATED APPLICATION

This application claims the benefit of priority under 35 U.S.C. § 120 as a continuation of PCT Patent Application No. PCT/CN2019/116233, filed on Nov. 7, 2019, the disclosure of which is incorporated herein by reference in its entirety.

TECHNICAL FIELD

The disclosure relates generally to wireless communications, including but not limited to systems and methods for indicating a PUCCH transmission repetition mode.

BACKGROUND

Transmissions over wireless channels are subject to errors such as variations in signal quality, high noise, or a high interference level. Hybrid Automatic Repeat Request (HARQ) relies on a combination of error-correcting coding and retransmission of erroneous data units. HARQ acknowledgements are transmitted on a PUCCH (physical uplink control channel).

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one embodiment, a method performed by a wireless communication node includes configuring, by a wireless communication node, a transmission repetition mode and at least one resource for an uplink channel transmission of a wireless communication device, the transmission repetition mode indicating at least one of: a number of times of the uplink channel transmission to be performed, one or more multiplexing modes of the number of times of the uplink channel transmission to be performed, and one or more time locations of the number of times of the uplink channel transmission to be performed. The method includes transmitting, by the wireless communication node, the transmission repetition mode to the wireless communication device.

In one embodiment, a method performed by a wireless communication device includes receiving, by the wireless communication device from a wireless communication node via downlink control information, a transmission repetition mode for an uplink channel transmission of the wireless communication device, the transmission repetition mode indicating at least one of a number of times of the uplink channel transmission to be performed, one or more multiplexing modes of the number of times of the uplink channel transmission to be performed, and one or more time locations of the number of times of the uplink channel transmission to be performed. The method includes performing, by the wireless communication device, the uplink channel transmission for the number of times, according to the transmission repetition mode.

In some embodiments, each of the number of times of the uplink channel transmission is associated with one transmission beam. In some embodiments, the method further includes transmitting, by the wireless communication node, the transmission repetition mode to the wireless communication device via downlink control information or channel state information report configuration.

In some embodiments, the method further includes transmitting the transmission repetition mode via at least one of a timing indicator field carrying information of a timing indicator, a resource indicator field carrying information of a resource indicator, or a field of downlink control information carrying information of the timing indicator and the resource indicator.

In one embodiment, a method performed by a wireless communication node includes configuring, by the wireless communication node, an association among a poolindex, at least one of two types of uplink control channel resource groups, a configured grant, and a demodulation reference signal (DMRS) port of a data transmission scheduled by downlink control information without port indication.

In one embodiment, a method includes predefining an association among a poolindex, at least one of two types of uplink control channel resource groups, a configured grant, and a demodulation reference signal (DMRS) port of a data transmission scheduled by downlink control information without port indication and transmitting, by a wireless communication node, the poolindex.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 3 illustrates an example table of HARQ offset indication states for transmission repetition modes, in accordance with some embodiments of the present disclosure.

FIG. 4 illustrates an example table of HARQ offset indication states for time offsets, in accordance with some embodiments of the present disclosure.

FIG. 6 illustrates an example table of a joint DCI field, in accordance with some embodiments of the present disclosure.

DETAILED DESCRIPTION OF EXAMPLE EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

A. Network Environment and Computing Environment

Figure 1:
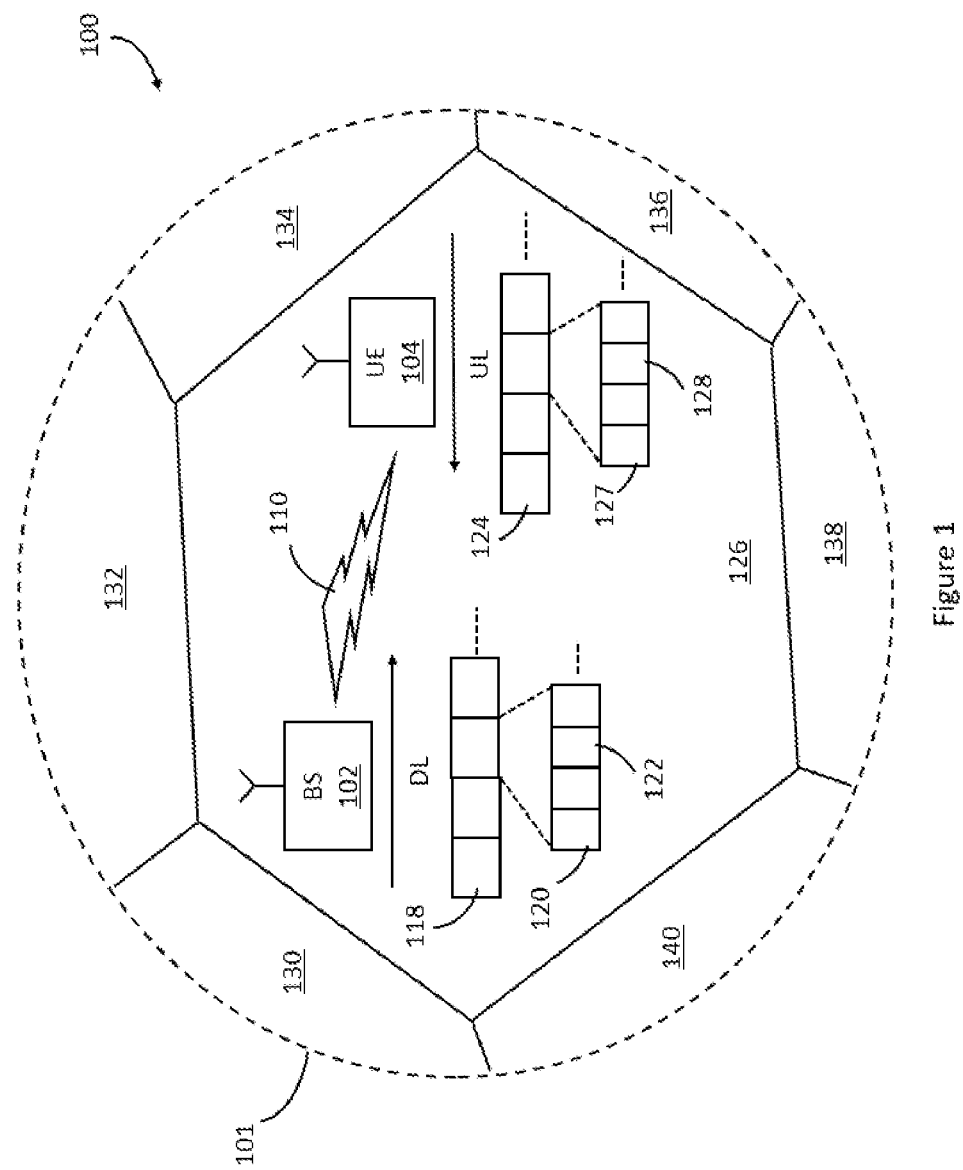
FIG. 1 illustrates an example cellular communication network in which techniques and other aspects disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102") and a user equipment device 104 (hereinafter "UE 104") that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
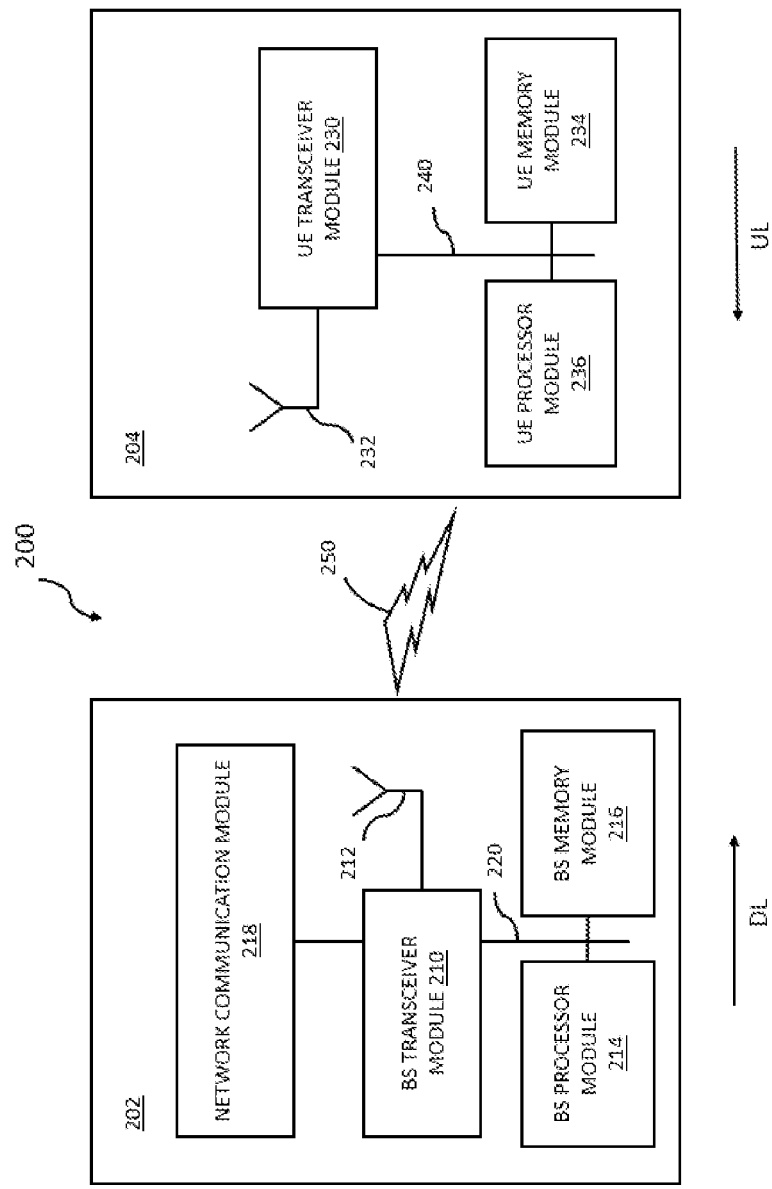
FIG. 2 illustrates block diagrams of an example base station and a user equipment device, in accordance with some embodiments of the present disclosure.

FIG. 2 illustrates a block diagram of an example wireless communication system 200 for transmitting and receiving wireless communication signals, e.g., OFDM/OFDMA signals, in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

B. Transmission Repetition Mode Indicators

In the current NR (new radio) release, the UE (e.g., the UE 102, the UE 202, user equipment, a terminal, a user, a wireless communication device, etc.) transmits the HARQ (hybrid automatic repeat request) ACK/NACK (acknowledgement/negative acknowledgement) on a PUCCH (physical uplink control channel) resource. The base station (e.g., a BS, the BS 102, the BS 104, a gNB, a wireless communication node, etc.) configures multiple PUCCH resources by using higher layer signaling, such as RRC (radio resource control) signaling or MAC-CE (medium access control-control element) signaling. The base station uses a PRI (PUCCH resource indicator) in the DCI (downlink control information) to select (e.g., select, pick, indicate, determine, etc.) one of the PUCCH resources configured using the higher layer. A beam (e.g., beam, beamform, etc.), including a spatial relation and/or a TCI (transmission configuration indicator) is activated to each PUCCH resource. The base station configures the UE with multiple HARQ time offsets by using a predefinition or a high-level signaling parameter such as dl-DataToUL-ACK. The base station uses the HARQ offset indication PHFTI (PDSCH-to-HARQ_feedback timing indicator) in the DCI to select one of the HARQ time offsets (from pre-definition or high-level signaling configuration) for the UE. The UE transmits the PUCCH on the PUCCH resource(s) indicated by the DCI, and at a time corresponding to the indicated HARQ time offset.

The current release works well at low frequencies because the base station can dynamically select the PUCCH resources and time of PUCCH transmissions. In higher frequency bands, beamforming is a very good technique to compensate the path loss. However, the beamforming signal in some directions may be blocked by human body and some other subjects between UE and base station. Usually, the blockage is dynamically varied and unpredictable. Thus, a technical solution is needed that can improve the robustness of the PUCCH transmission in blockage scenario.

In order to increase robustness, the PUCCH can repeat multiple transmissions and transmit using different beams. The base station can dynamically control the number of repeated transmissions, and the beam transmitted by the PUCCH. The base station can indicate time locations at which the PUCCH repeats the transmission multiple times.

In some embodiments, the base station configures a transmission repetition mode and at least one resource for a transmission (e.g., an uplink channel transmission, a PUCCH) of a UE. In some embodiments, the base station dynamically indicates a transmission repetition mode of PUCCH transmission by using HARQ offset indication and/or PRI in the DCI or a CSI (channel state information) report configuration. In some embodiments, the transmission repetition mode indicates or includes one or more of the following: a number of transmissions T (e.g., T is greater than or equal to 1), a number of transmitted beams M (e.g., M is greater than or equal to 1), a correspondence between T transmissions and M beams, time locations of the number of transmissions T (e.g., time locations at which T transmissions are located), and a relationship between T transmissions. In some embodiments, the relationship between T transmissions includes multiplexing of the T transmissions. In some embodiments, the multiplexing of the T transmissions includes at least one of the following: SDM (spatial division multiplexing), TDM (time division multiplexing), FDM (frequency division multiplexing), a combination of TDM and SDM, and a combination of TDM and FDM. In some embodiments, the base station transmits the transmission repetition mode to the UE via the DCI or the CSI report configuration. In some embodiments, the base station transmits the transmission repetition mode via at least one of: a timing indicator field (e.g., PHFTI) or a resource indicator field (e.g., PRI), or a (e.g., new) field of the downlink control information. In some embodiments, the field in DCI carries information of timing indicator and resource indicator.

In some embodiments, the data carried by the T times of PUCCH transmissions are the same (e.g., the T times of PUCCH transmission include repeated transmissions). In some embodiments, each of the uplink channel transmissions corresponds to one beam.

In some embodiments, the transmission repetition mode is one of a plurality of transmission repetition modes. FIG. 3 illustrates an example table of HARQ offset indication states for transmission repetition modes, in accordance with some embodiments of the present disclosure. Different HARQ offset indication states in the DCI may indicate multiple independent PUCCH transmission repetition modes. For example, 3 bits of HARQ offset indication (e.g., the PHFTI) can be used to indicate eight independent transmission repetition modes, as shown in FIG. 3. In some embodiments, the parameters of each of the transmission repetition modes are configured by higher layer signaling. In some embodiments, the higher layer signaling includes RRC signaling or MAC-CE signaling.

FIG. 4 illustrates an example table of HARQ offset indication states for time offsets, in accordance with some embodiments of the present disclosure. If the UE does not have the capability of transmitting multiple beams or multiple PUCCHs at a same time, or if the base station can transmit multiple times to the UE through the higher layer signaling configuration only via TDM, parameters corresponding to each transmission repetition mode may include one or more time offset values. In some embodiments, the transmission repetition mode indicates that the time locations of the times of the uplink channel transmission is to be performed according to one or more time offsets. In some embodiments, the base station uses higher layer signaling configures or predefines multiple sets of time offsets. In some embodiments, the base station selects one of the sets of time offsets using the HARQ offset indication (e.g., the PHFTI) in the DCI. As shown in FIG. 4, 2 bits of HARQ offset indication indicate a time offset corresponding to a maximum of 4 sets of time offsets configured via higher layer signaling configurations. In some embodiments, each set contains 1 or more time offsets, such as an offset value between a PDSCH (physical downlink shared channel) and the PUCCH transmission.

A unit of the offset value can be a slot or symbol. In some embodiments, the number of the uplink channel transmission corresponds to at least t transmissions. In some embodiments, the time offset for a $t^{th}$ transmission is relative to a time domain location of the $(t-1)^{th}$ transmission or relative to a reference slot or symbol. For example, a first set includes (e.g., includes or is associated with) slots n+2 and n+3 (e.g., n is the reference slot, such as slot 0), a second slot set includes slot n+4, a third slot set includes slots n+5, n+6, and n+7, and a fourth slot set includes slots n+5 and n+7. In some embodiments, if the PHFTI=00 in the DCI, and the PDSCH is transmitted in slot n, then the UE repeats the transmission of PUCCH twice at slots n+2 and n+3. In some embodiments, if the PHFTI=01 in the DCI, then the UE repeats the transmission of the PUCCH once on slot n+4. In some embodiments, if the PHFTI=10 in the DCI, then the UE repeats the transmission of the PUCCH three times on the slots n+5, n+6, and n+7. In some embodiments, if the PHFTI=11, in the DCI, then the UE repeats the transmission of PUCCH twice on slot n+5 and n+7.

In some embodiments, a total number of the one or more time offsets is equal to the number of times the uplink channel transmission is to be performed (e.g., a number of times the PUCCH is repeatedly transmitted is equal to a number of offset values corresponding to the HARQ offset indication in the DCI).

If only one beam is configured or activated for the PUCCH resource that is indicated or configured by a PRI or a CSI report, in some embodiments, the only one beam is used for all PUCCH repetitions. In some embodiments, the transmission repetition mode further indicates a number of transmission beams of the UE, for the at least one resource. In some embodiments, the transmission repetition mode indicates the mapping between the times (e.g., total number of repetitions or transmissions) of the uplink channel transmission and the transmission beams.

If more than one beam (e.g., M beams) is used (e.g., using beam diversity), the M beams are configured or activated by MAC-CE for the PUCCH resource that is selected or configured by the PRI or the CSI report. In some embodiments, the base station predefines or configures, using higher layer signaling, the mapping between T PUCCH transmissions and the M beams. In some embodiments, one beam refers to one spatial relation or one TCI state. For instance, M=2 beams are activated for the PUCCH resource selected or configured by the PRI or CSI report, and M beams are cycling on the T (e.g., T=4) PUCCH repetitions, e.g., beams 0, 1, 0, and 1 are used on PUCCH repetitions 0, 1, 2, and 3, respectively. In some embodiments, T repetitions are divided into M groups. In some embodiments, each repetition group contains $$\left\lfloor \frac{T}{M} \right\rfloor \text{ or } \left\lceil \frac{T}{M} \right\rceil$$

continuous repetitions. In some embodiments, the M beams are used on M PUCCH repetition groups in order. For instance, beams 0, 0, 1, and 1 are used on PUCCH repetition 0, 1, 2, and 3, respectively.

Traditionally, beam of each PUCCH resource is activated by a MAC-CE. If X PUCCH resource is configured, X independent MAC-CEs are needed. MAC-CE overhead is significant. In some embodiments, the transmission repetition mode indicates to divide configured X PUCCH resources into M' groups. In some embodiments, M' is equal to or greater than M. In some embodiments, PUCCH resources within a same PUCCH resource group have the same beam. In order to configure M beams for a PUCCH resource (or multiple PUCCH resources), in some embodiments, the PUCCH resource (or multiple PUCCH resources) can be included in (or divided into) M PUCCH resource groups. In some embodiments, each of the M or M' number of resource groups associated with one of the transmission beams of the UE. In some embodiments, M is an integer greater than 1. In some embodiments, when more than one beam (e.g., M>1) is activated for the PRI selected PUCCH resource and a single PUCCH repetition is indicated by PHFTI, one of the M beams can be determined for the single PUCCH repetition.

In some embodiments, the base station predefines one of the M beams or a selection of one of the M beams (e.g. always the first of M beams is used). In some embodiments, the base station associates sets of TCI states with corresponding UL beams. In some embodiments, the selection of one of the M beams is based on the TCI code-point in the DCI. For instance, M (or M') beams of PUCCH resources correspond to a M (or M') sets of one or more TCI states, respectively. If the TCI state(s) indicated by TCI code-point belongs to an $m^{th}$ set of TCI states, an $m^{th}$ beam, associated with the $m^{th}$ set of TCI states, is used for the PUCCH transmission. In some embodiments, associating M (or M') beams to M (or M') sets of one or more TCI is extended to when more than one PUCCH repetitions are indicated.

In some embodiments, the beam selection(s) of a PRI indicated PUCCH resource is based on the TCI code-point in the DCI. In some embodiments, the TCI code-point indicates a number of DL (downlink) beams. In some embodiments, one DL beam refers to, or is otherwise associated with, one TCI state. The UL (uplink) beam selection can be determined by the DL beam selection based on DL/UL channel reciprocity. If multiple beams are used for DL, then multiple beams can be used for UL beams. In some embodiments, the number of UL beams of PUCCH resource is based on the number of DL beams indicated by TCI code-point.

Figure 5:
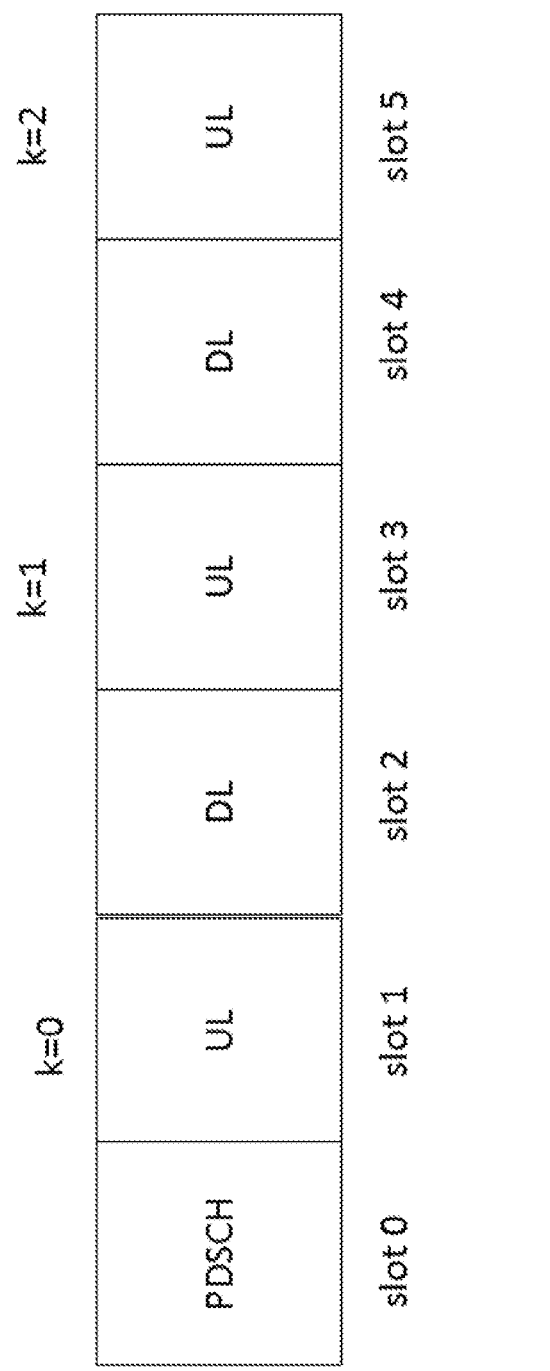
FIG. 5 illustrates an example diagram of valid time offset values, in accordance with some embodiments of the present disclosure.

FIG. 5 illustrates an example diagram of valid time offset values, in accordance with some embodiments of the present disclosure. In some embodiments, a time offset of value k refers to a $(k+1)^{th}$ available time unit(s) for an uplink channel transmission (e.g., valid slot or time occasion after the PDSCH for PUCCH transmission). For example, a time offset of value k=1 refers to the second valid slot which can be used for PUCCH transmission after PDSCH. In some embodiments, a time offset of value k=2 refers to a third valid slot which can be used for PUCCH transmission after PDSCH. In some embodiments, a valid slot refers to a slot that has available UL symbols for the corresponding PUCCH transmission. As shown in FIG. 5, a DL slot is not valid slot for PUCCH transmission. In some embodiments, k=1 corresponds to a second valid slot (e.g., slot 3) that can be used for the PUCCH transmission. In some embodiments, the PUCCH repetitions can be in contiguous valid slots. In some embodiments, multiple time offsets may be unnecessary, and the base station informs (e.g., informs, notifies, indicates to, etc.) the UE of a number of repetitions T and the time offset of a first repetition (e.g., valid slot offset or absolute slot offset). In some embodiments, the UE transmits the PUCCH repetitions on T contiguous valid slots based on receiving the notification. In some embodiments, the number of repetitions is higher layer configured and selected by the PRI or the PHFTI.

In some embodiments, the PUCCH transmission repetition mode can be indicated by a combination of (e.g., jointly indicated by) the PHFTI and the PRI. In some embodiments, the PRI field and the PHFTI field in the DCI are jointly encoded. FIG. 6 illustrates an example table of a joint DCI field, in accordance with some embodiments of the present disclosure. A joint DCI field herein refers to a DCI including a PRI field and a PHFTI field. In some embodiments, the joint DCI field is used to select a PUCCH resource, indicate PHFTI, and indicate PUCCH transmission repetition mode. A DCI size of a joint DCI field can be same as a DCI size of a DCI field (e.g., legacy DCI field) including only one of the PRI field and the PHFTI field. In some embodiments, the joint DCI field has more bits than the legacy DCI field. In some embodiments, because of more bits of PRI field and PHFTI field in DCI, more states can be represented by the joint DCI field. For instance, a total of 5 bits of the joint field is used as shown in FIG. 6. The specific parameters of each PUCCH transmission repetition mode is configured by higher layer signaling that may include the information about one or more PUCCH resources, one or more activated/configured beams, one or more PHFTIs, the number of PUCCH transmissions T, the mapping of M beams and T repetitions, and/or a mapping of one or more multiplexing modes and T transmissions. It is noted that the joint DCI field can be a new DCI field which carries information on repetition mode, PUCCH resource selection, timing selection.

In blockage scenarios, the current NR mechanism for periodic and semi-persistent PUCCH transmission only supports a single beam. If the configured or activated beam is blocked in some PUCCH occasions, the base station will not receive feedback (e.g., of the HARQ acknowledgement) from the UE.

In some embodiments, CSI feedback is periodically transmitted on PUCCH. In order to get beam diversity gain, a PUCCH resource can be transmitted several times with independent beams within one periodicity. Since the slot format may not include several continuous UL slots, T number of time offsets can be configured for one CSI report (e.g., CSI-ReportConfig). The time offset can be slot level or symbol level basis. In some embodiments, T is greater or equal to one. In some embodiments, each time offset corresponds to one PUCCH time domain occasion within one periodicity.

For each CSI report, the PUCCH transmission repetition mode can be configured. In some embodiments, the transmission repetition mode includes TDM/FDM/SDM among multiple PUCCH transmissions, T time offsets, PUCCH resource(s) with M beams, and/or the mapping between C PUCCH occasion and M beams.

Figure 7:
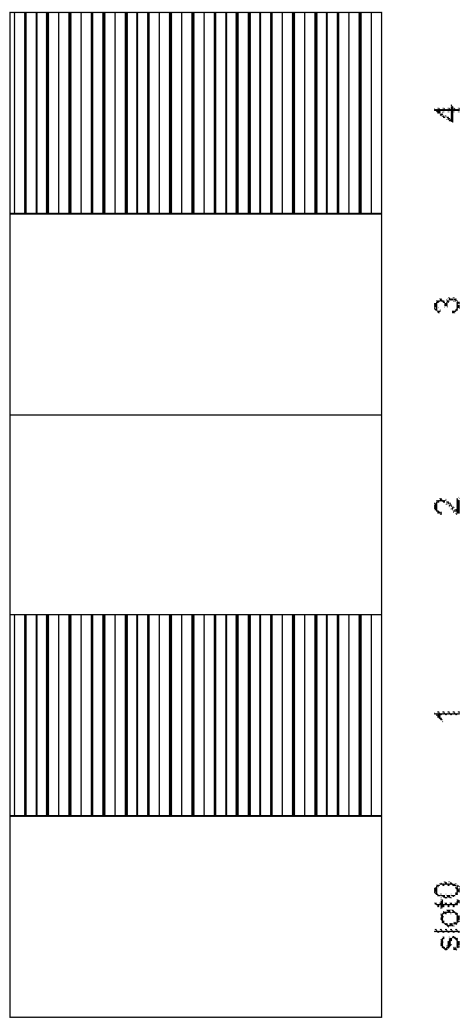
FIG. 7 illustrates an example configuration of time slots according to a CSI report, in accordance with some embodiments of the present disclosure.

FIG. 7 illustrates an example configuration of time slots according to a CSI report, in accordance with some embodiments of the present disclosure. As shown in FIG. 7, the base station configures a periodicity of 5 slots, a number of slot offsets T=2 slot offsets, a first slot offset T1=1, and a second slot offset T2=4. In some embodiments, based on the configuration, the UE repeats PUCCH transmission twice in slot 1 and slot 4.

Figure 8:
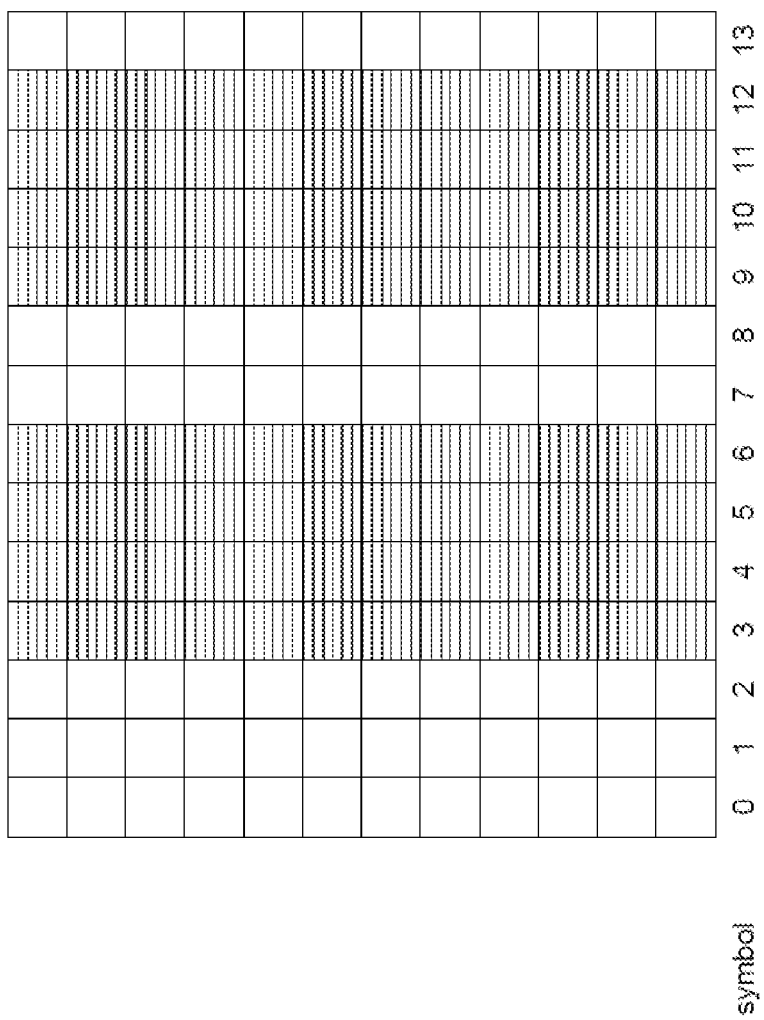
FIG. 8 illustrates an example configuration of time slots according to a CSI report, in accordance with some embodiments of the present disclosure.

FIG. 8 illustrates an example configuration of time slots according to a CSI report, in accordance with some embodiments of the present disclosure. In some embodiments, the time domain locations of a subsequent (e.g., second, third, or otherwise additional) PUCCH repetition are based on a first PUCCH time domain location and a time offset against the first PUCCH repetition. The time offset can be a slot offset or a symbol offset. The slot offset of the first PUCCH repetition can be configured (e.g., configured or encoded) jointly with periodicity. As shown in FIG. 8, the base station configures a slot offset of 1 for the first PUCCH transmission. In some embodiments, the UE transmits the first PUCCH repetition in slot 1 based on the configuration. As shown in FIG. 8, the base station configures a second time offset of two symbols for the second PUCCH repetition. In some embodiments, the UE transmits the second PUCCH repetition two symbols after the first one based on the configuration of the second time offset. In some embodiments, the base station can jointly encode, in a first CSI report, a slot offset of the first PUCCH repetition and the periodicity. In some embodiments, the base station can encode, in subsequent CSI reports, subsequent time offset(s) for the subsequent PUCCH repetitions.

In order to save, minimize or reduce MAC-CE overhead for a UE, configured X PUCCH resources can be divided into Y groups. In some embodiments, PUCCH resources within the same group have a same beam, e.g., Y can be 1, 2, 3 or 4. In some embodiments, maximum Y beams are supported for a serving cell or for a BWP (bandwidth part) or for a UE. One MAC-CE transmission can be used to update the beam of a PUCCH resource group (e.g., a first type PUCCH resource group).

In order to support multi-TRP (transmission reception point) transmission, in some embodiments, the base station introduces (e.g., introduces, configures, determines, generates, etc.) one or more higher layer indices (e.g., TRP index, poolindex, and/or CORESETPoolIndex) per CORESET (control resource set). Candidate values (e.g., candidate TRP index values) can be 0 or 1, corresponding to a first TRP and a second TRP, respectively. In some embodiments, the configured CORESETs are grouped into B (e.g., B=2) sets corresponding to two TRPs.

In order to implement separate PUCCH transmissions for the multiple TRPs, PUCCH resources can be divided into B PUCCH resource groups (e.g., second type PUCCH resource groups). In some embodiments, each second type PUCCH resource group is associated with a higher layer index (e.g., a TRP index) per CORESET. For example, a second type PUCCH resource group 0 is associated with a TRP index 0, and a second type PUCCH resource group 1 is associated with a TRP index 1.

In order to avoid scheduling error, in some embodiments, the base station associates two types of PUCCH resource groups. In some embodiments, the base station predefines rules. One of the predefined rules can include that all PUCCH resources within one type 1 PUCCH resource group are associated with the same TRP index (i.e. the same type 2 PUCCH group). In some embodiments, PUCCH resources within a type 1 PUCCH resource group, e.g., group i, are not associated with different TRP indices. In some embodiments, the UE does not identify (e.g., expect) some PUCCH resources within a type 1 PUCCH resource group to be associated with TRP index 0, but the UE identifies some other PUCCH resources within the type 1 PUCCH resource group to be associated with TRP index 1. In some embodiments, all PUCCH resources within one type 1 PUCCH resource group belong to a same type 2 PUCCH resource group. In some embodiments, two TRP use separate beams in the case of non-ideal backhaul between two TRPs.

In some embodiments, when non-ideal back haul is used between two TRPs, UL configure grant PUSCH scheduling by different TRPs is independent. In order to sustain different power control (e.g., close loop power control), the base station informs the UE the higher layer index (e.g., TRP index or poolindex) of the configure grant PUSCH. In some embodiments, for PUSCH transmissions from different TRPs, the power control is independent. In some embodiments, for PUSCH transmissions from the same TRP, the power control is same.

In some embodiments, the base station associates the TRP index with each configure grant PUSCH (ConfiguredGrantConfig). In some embodiments, the base station configures one new parameter (e.g., poolindex) for each higher layer parameter ConfiguredGrantConfig. In some embodiments, the base station configures an association among the poolindex, at least one of two types of PUCCH resource groups, one configured grant, and a DMRS (demodulation reference signal) port of a data transmission scheduled by a DCI without port indication. In some embodiments, an association is predefined among the poolindex, at least one of two types of PUCCH resource groups, one configured grant, and a DMRS (demodulation reference signal) port of a data transmission scheduled by a DCI without port indication. In some embodiments, the base station associates the poolindex with, or refers the poolindex to the TRP index (e.g., the higher layer index per CORESET or a carrier index). In some embodiments, the poolindex can be the TRP index.

In some embodiments, if poolindex in a ConfiguredGrantConfig is 0, then PUSCH transmission based on the ConfiguredGrantConfig is associated with the TRP index 0. In some embodiments, if poolindex in a ConfiguredGrantConfig is 1, then PUSCH transmission based on the ConfiguredGrantConfig is associated with the TRP index 1. In some embodiments, all (e.g., PUCCH) resources within one type 1 (e.g., PUCCH) resource group are associated with one type 2 (e.g., PUCCH) resource group. In some embodiments, the resources within the type 1 resource group have a transmission beam (e.g., a same transmission beam) and the resources within the type 2 group are associated with the same poolindex.

In some embodiments, DMRS (demodulation reference signal) ports of two PDSCHs scheduled by two PDCCHs that are from two CORESETs with different TRP indices, e.g., DMRS ports of two PDSCH scheduled by two TRPs, are orthogonal if the two PDSCHs are overlapping (e.g., fully overlapping or partial overlapping, in the time domain or the frequency domain). From the UE side, although the two PDSCH can interfere with each other, in some embodiments, the orthogonal DMRS ports of the two PDSCHs are used for decoding. In some embodiments, to use a same receiving beam in one time/frequency resource, DMRS ports of two PDSCH are mapped on different DMRS CDM (code division multiplexing) groups. In some embodiments, the base station configures a DCI format 1_1 to be used for PDSCH scheduling. Two TRPs can coordinate and semi-statically use different DMRS CDM groups for DMRS transmission. In some embodiments, when a UE is configured by the higher layer parameter PDCCH-Config that contains two different values of CORESETPoolIndex or TRP index in CORESETs, the UE may be scheduled with overlapping PDSCHs by multiple PDCCHs. In some embodiments, the base station and/or the UE has to comply with rules or restrictions regarding scheduling the UE with overlapping PDSCHs by multiple PDCCHs. The rules or restrictions can include that the UE does not identify (e.g., is not expected to identify, is not expected to assume, etc.)

that DMRS ports in a CDM group are indicated by two TCI states. In some embodiments, one TCI corresponds to one TRP index. For the DCI format 1_1, X bits of antenna port field in the DCI is used to indicate DMRS port information for each PDSCH. In some embodiments, two DCI from two TRPs (associated with different TRP indices) ensure indicated DMRS ports map on different CDM groups.

However, an antenna port field does not exist in DCI form 1_0. There is no way to choose DMRS port for PDSCHs from different TRPs. Some embodiments associate the DMRS port of PDSCH scheduled by DCI format 1_0 with the TRP index. In some embodiments, if a PDSCH is scheduled by a DCI format 1_0 that is associated with TRP index 0, the DMRS port of the PDSCH is (e.g., assigned to, assumed to be, etc.) DMRS port 0 (or 1). If a PDSCH is scheduled by a DCI format 1_0 that is associated with TRP index 1, the DMRS port of this PDSCH is DMRS port 2 (or 3).

In some embodiments, if a PDSCH is scheduled by a DCI format 1_0 that is associated with TRP index 0, the DMRS port of this PDSCH is DMRS port 0 (or 1). If a PDSCH is scheduled by a DCI format 1_0 that is associated with TRP index 1, the DMRS port of this PDSCH is DMRS port 3 (or 2). In some embodiments, the DMRS port of PDSCH from TRP 0 is still the same as the legacy NR. In some embodiments, only DMRS ports of PDSCH from TRP 1 may be changed. In some embodiments, one RRC signaling can be used to indicate whether the DMRS port of PDSCH scheduled by a DCI format 1_0 associated with TRP index 1 is port 0 or port 2 (or 3). In some embodiments, if associated with port 0, then the DMRS port of TRP 1 is the same as a DMRS port associated with legacy (e.g., legacy, current, traditional) NR release.

In some embodiments, DMRS port i refers to DMRS port 1000+i. In some embodiments, for scheduled PDSCHs (or PUSCHs) by some DCIs which have no antenna port field, the DMRS port for each data transmission (e.g., PDSCH) is determined by the TRP index or poolindex associated with the DCI.

DCI format 1_0 can be used for both CSS (common search space) and USS (UE specific search space). In some embodiments, for the DCI format associated with the CSS, the DMRS port is same as a DRMS port associated with the legacy NR, and the PDSCH scheduled by the DCI is shared for all UEs. In some embodiments, for the DCI format associated with the USS, the DMRS port for each PDSCH is determined by the TRP index associated with the DCI. In some embodiments, the related RNTI (radio network temporary identifier) of USS includes at least one of C-RNTI (cell-RNTI), MCS-C-RNTI (modulation coding scheme-C-RNTI), CS-RNTI, and SP-CSI-RNTI.

In some embodiments, a reuse CA (carrier aggregation) structure supports multi-TRP transmission. In some embodiments, one carrier (e.g., carrier or serving cell) refers to one TRP. Some carrier corresponding to multiple TRPs in the overlapping frequency band can cover the same or overlapping frequency resource. In some embodiments, since antenna port field does not exist in DCI form 1_0, there is no way to choose DMRS port for PDSCHs from different TRP. Some embodiments associate the DMRS port of PDSCH scheduled by DCI format 1_0 with the carrier index (e.g., carrier index or called serving cell index). In some embodiments, the DMRS port for each PDSCH is determined by a carrier index (e.g., instead of TRP index). In some embodiments, each carrier refers to one TRP.

In some embodiments, if a PDSCH is scheduled by a DCI format 1_0 for a carrier index a, the DMRS port of this PDSCH is DMRS port 0 (or 1). In some embodiments, if a PDSCH is scheduled by a DCI format 1_0 for carrier index b, the DMRS port of the PDSCH is DMRS port 2 (or 3). In some embodiments, carrier a and b are different and can be higher layer configured. For instance, the candidate carrier a can include carriers 0, 1, 4, and 5, and the candidate carrier b can include carrier 2, 3, 6, and 7. The candidate carrier a or b can be configured by higher layer signaling.

Figure 9:
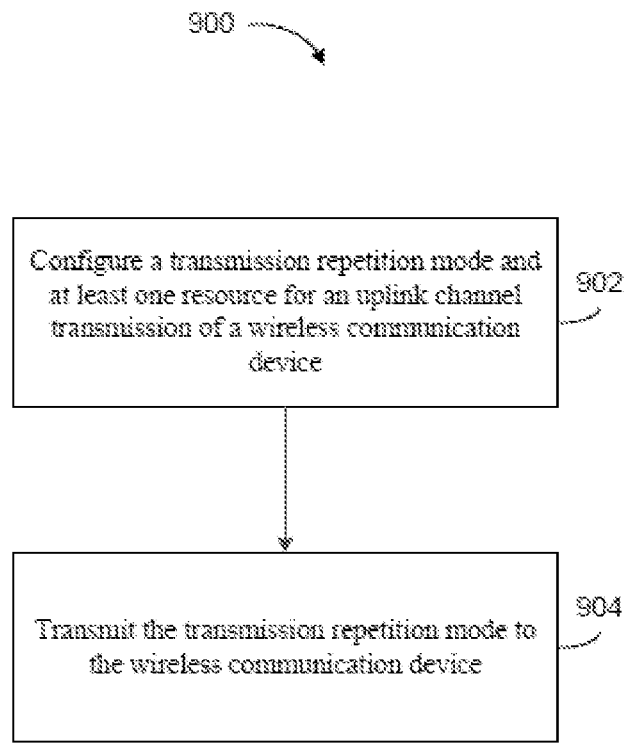
FIG. 9 illustrates a flowchart diagram illustrating a method for configuring a transmission repetition mode, in accordance with some embodiments of the present disclosure.

FIG. 9 illustrates a flowchart diagram illustrating a method 900 for configuring a transmission repetition mode, in accordance with some embodiments of the present disclosure. Referring to FIGS. 1-8, the method 900 is performed by the BS 102 and/or the BS 202, in some embodiments. Additional, fewer, or different operations may be performed in the method 900 depending on the embodiment.

A wireless communication node configures a transmission repetition mode and at least one resource for an uplink channel transmission of a wireless communication device (902). In some embodiments, the transmission repetition mode indicates at least one of: a number of times of the uplink channel transmission to be performed, one or more multiplexing modes of the number of times of the uplink channel transmission to be performed, and one or more time locations of the number of times of the uplink channel transmission to be performed.

The wireless communication node transmits the transmission repetition mode to the wireless communication device (904). In some embodiments, each of the number of times of the uplink channel transmission is associated with one transmission beam. In some embodiments, the transmission repetition mode to the wireless communication device via downlink control information or channel state information report configuration.

Figure 10:
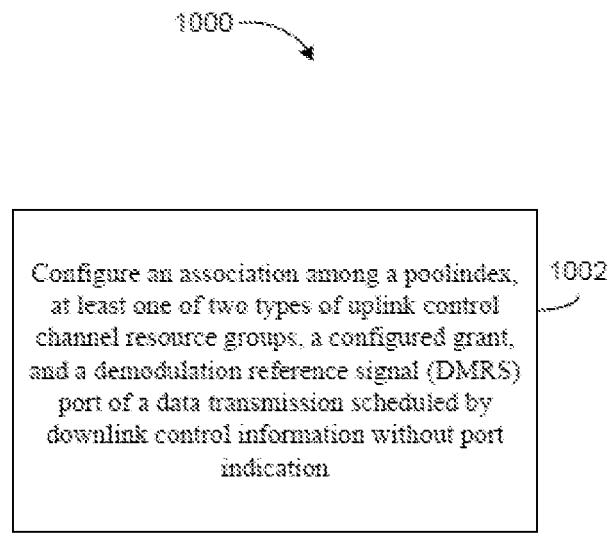
FIG. 10 illustrates a flowchart diagram illustrating a method for configuring associations to a poolindex, in accordance with some embodiments of the present disclosure.

FIG. 10 illustrates a flowchart diagram illustrating a method 1000 for configuring associations to a poolindex, in accordance with some embodiments of the present disclosure. Referring to FIGS. 1-8, the method 1000 is performed by the BS 102 and/or the BS 202, in some embodiments. Additional, fewer, or different operations may be performed in the method 1000 depending on the embodiment.

The wireless communication node configures an association among a poolindex, at least one of two types of uplink control channel resource groups, a configured grant, and a demodulation reference signal (DMRS) port of a data transmission scheduled by downlink control information without port indication (1002). In some embodiments, the poolindex refers to a higher layer index configured per control resource set, or carrier index. In some embodiments, the DMRS port of the data transmission scheduled by downlink control information without port indication is determined according to the poolindex.

Figure 11:
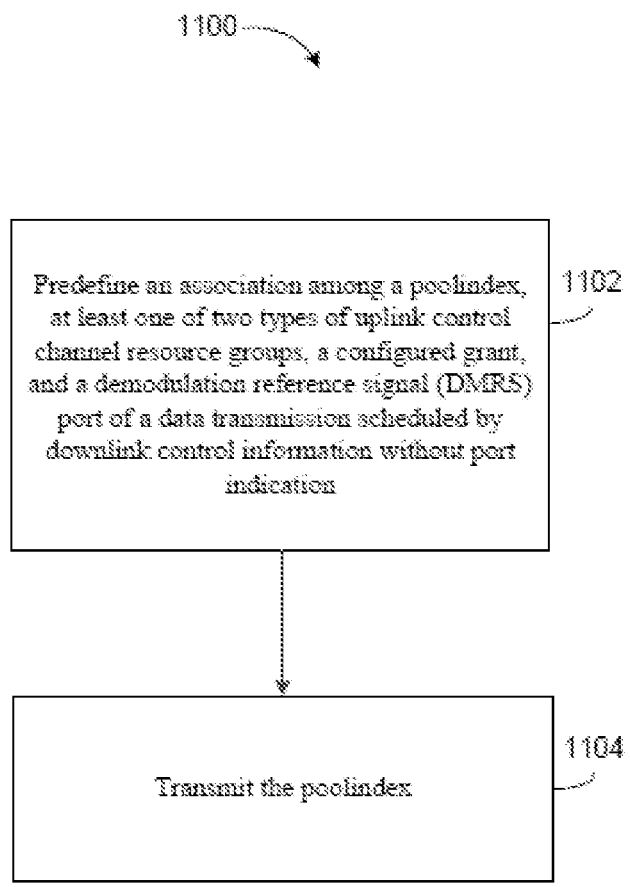
FIG. 11 illustrates a flowchart diagram illustrating a method for predefining associations to a poolindex, in accordance with some embodiments of the present disclosure.

FIG. 11 illustrates a flowchart diagram illustrating a method 1100 for predefining associations to a poolindex, in accordance with some embodiments of the present disclosure. Referring to FIGS. 1-8, the method 1100 is performed by the BS 102 and/or the BS 202, in some embodiments. Additional, fewer, or different operations may be performed in the method 1100 depending on the embodiment.

The wireless communication node predefines an association among a poolindex, at least one of two types of uplink control channel resource groups, a configured grant, and a demodulation reference signal (DMRS) port of a data transmission scheduled by downlink control information without port indication (1102). The wireless communication node transmits the poolindex (1104). In some embodiments, the poolindex refers to a higher layer index configured per control resource set, or carrier index. In some embodiments, resources within one type 1 resource group are associated with one type 2 resource group, wherein the resources within the type 1 resource group have a transmission beam, and the resources within the type 2 resource group are associated with a same poolindex.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method, comprising:
   performing, by a wireless communication device, an uplink channel transmission for a number of times, according to a transmission repetition mode, wherein an indication of the number of times of the uplink channel transmission to be performed is received by the wireless communication device from a wireless communication node, wherein the transmission repetition mode includes (i) the number of times of the uplink channel transmission to be performed, and (ii) a number of transmission beams of the wireless communication device, for at least one resource, wherein (a) the transmission beams of the number of transmission beams are applied in cyclic order on the times of the uplink channel transmission to be performed, or (b) a respective one of the transmission beams is applied to each of a plurality of groups, wherein a number of groups in the plurality of groups is equal to a number of the transmission beams.

2. The method of claim 1, wherein each of the number of times of the uplink channel transmission to be performed, is associated with one transmission beam.

3. The method of claim 1, wherein the indication of the number of times of the uplink channel transmission to be performed is received from the wireless communication node via downlink control information.

4. The method of claim 1, wherein each of the transmission beams refers to a respective spatial relation.

5. The method of claim 1, wherein the transmission repetition mode further includes a multiplexing mode of the number of times of the uplink channel transmission to be performed, the multiplexing mode of the number of times of the uplink channel transmission to be performed includes time division multiplexing.

6. A wireless communication device, comprising:
at least one processor configured to:
perform an uplink channel transmission for a number of times, according to a transmission repetition mode, wherein an indication of the number of times the uplink channel transmission is to be performed is received by the wireless communication device from a wireless communication node,
wherein the transmission repetition mode includes (i) the number of times of the uplink channel transmission to be performed, and (ii) a number of transmission beams of the wireless communication device, for at least one resource, wherein (a) the transmission beams of the number of transmission beams are applied in cyclic order on the times of the uplink channel transmission to be performed, or (b) a respective one of the transmission beams is applied to each of a plurality of groups, wherein a number of groups in the plurality of groups is equal to a number of the transmission beams.

7. The wireless communication device of claim 6, wherein each of the number of times of the uplink channel transmission to be performed, is associated with one transmission beam.

8. The wireless communication device of claim 6, wherein the indication of the number of times of the uplink channel transmission to be performed is received from the wireless communication node via downlink control information.

9. The wireless communication device of claim 6, wherein each of the transmission beams refers to a respective spatial relation.

10. The wireless communication device of claim 6, wherein the transmission repetition mode further includes a multiplexing mode of the number of times of the uplink channel transmission to be performed, the multiplexing mode of the number of times of the uplink channel transmission to be performed includes time division multiplexing.

11. A method comprising:
transmitting, by a wireless communication node to a wireless communication device, an indication of a number of times of uplink channel transmissions to be performed by the wireless communication device;
receiving, by the wireless communication node from the wireless communication device, an uplink channel transmission for the number of times, according to a transmission repetition mode,
wherein the transmission repetition mode includes (i) the number of times of the uplink channel transmission to be performed, and (ii) a number of transmission beams of a wireless communication device, for at least one resource, wherein (a) the transmission beams of the number of transmission beams are applied in cyclic order on the times of the uplink channel transmission to be performed, or (b) a respective one of the transmission beams is applied to each of a plurality of groups, wherein a number of groups in the plurality of groups is equal to a number of the transmission beams.

12. The method of claim 11, wherein each of the number of times of the uplink channel transmission to be performed, is associated with one transmission beam.

13. The method of claim 11, wherein the indication of the number of times of the uplink channel transmissions to be performed is transmitted by the wireless communication node via downlink control information.

14. The method of claim 11, wherein each of the transmission beams refers to a respective spatial relation.

15. The method of claim 11, wherein the transmission repetition mode further includes a multiplexing mode of the number of times of the uplink channel transmission to be performed, the multiplexing mode of the number of times of the uplink channel transmission to be performed includes time division multiplexing.

16. A wireless communication node comprising:
at least one processor configured to:
transmit, via a transmitter to a wireless communication device, an indication of a number of times uplink channel transmissions to be performed by the wireless communication device;
receive, via a receiver, an uplink channel transmission for the number of times, according to a transmission repetition mode,
wherein the transmission repetition mode includes (i) the number of times of the uplink channel transmission to be performed, and (ii) a number of transmission beams of the wireless communication device, for at least one resource, wherein (a) the transmission beams of the number of transmission beams are applied in cyclic order on the times of the uplink channel transmission to be performed, or (b) a respective one of the transmission beams is applied to each of a plurality of groups, wherein a number of groups in the plurality of groups is equal to a number of the transmission beams.

17. The wireless communication node of claim 16, wherein each of the number of times of the uplink channel transmission to be performed, is associated with one transmission beam.

18. The wireless communication node of claim 16, wherein the indication of the number of times of the uplink channel transmissions to be performed is transmitted by the wireless communication node via downlink control information.

19. The wireless communication node of claim 16, wherein each of the transmission beams refers to a respective spatial relation.

20. The wireless communication node of claim 16, wherein the transmission repetition mode further includes a multiplexing mode of the number of times of the uplink channel transmission to be performed, the multiplexing mode of the number of times of the uplink channel transmission to be performed includes time division multiplexing.

\* \* \* \* \*